Patented Nov. 4, 1924.

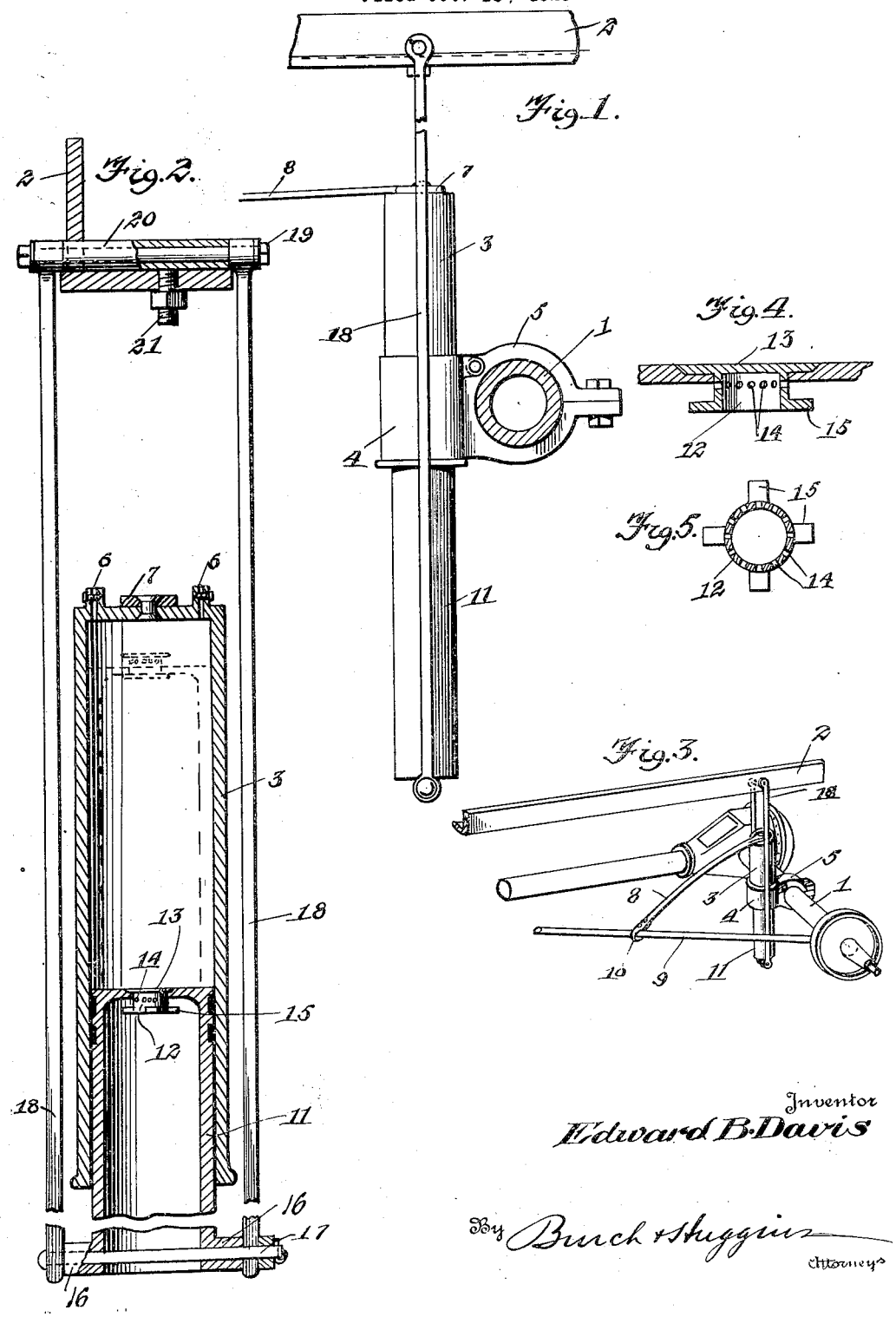

1,513,970

UNITED STATES PATENT OFFICE.

EDWARD B. DAVIS, OF CAMBRIDGE, OHIO.

SHOCK ABSORBER.

Application filed October 18, 1923. Serial No. 669,351.

*To all whom it may concern:*

Be it known that I, EDWARD B. DAVIS, a citizen of the United States, residing at Cambridge, in the county of Guernsey and State of Ohio, have invented certain new and useful Improvements in Shock Absorbers, of which the following is a specification.

This invention relates to improvements in shock absorbers adapted for absorbing the rebound of an automobile spring.

The invention is directed particularly to a construction wherein a cylinder is secured in a vertical position to the axle of an automobile and provided with adjustable restricted exhaust openings, the cylinder receiving a piston having a valve in the end portion adapted to permit inlet of air on the outward or downward stroke, the lower end of the piston projecting below the bottom of the cylinder and formed with oppositely extending lateral projections on which are journalled the ends of connecting links pivotally secured to a member carried by the frame.

The invention is more particularly described in the following description and illustrated in the drawings in which, Figure 1 is a side elevational view of the present invention, Figure 2 is a longitudinal sectional view, Figure 3 is a perspective view showing how the present invention is applied, Figure 4 is a detailed sectional view of the valve structure, and Figure 5 is a transverse sectional view of the valve removed.

—1— indicates the axle of an automobile supporting the body of the automobile on a frame —2— through the medium of springs, not shown, so that in the use of the automobile the body is resiliently supported by the axle in a well known manner. It is also well known that as the automobile rides over irregular surface or drops into ruts in the roadway that the downward movement of the body relative to the axle on the springs is followed by a quick upward movement due to the rebound of the springs into their normal positions which, however, causes the body to move past the normal position of the springs in the rebound and occasions considerable jolt to the body and occupants of the automobile.

The present invention is designed to overcome this rebound action and permit the gradual return of the springs to the normal position and includes the cylinder —3— provided with a bracket —4— mounted on the lower end thereof adapted to partially encircle the axle —1— and a member —5— pivoted thereto cooperating with the bracket to secure the cylinder to the rear axle. The closed end of the cylinder is provided at —6— with adjustable restricted exhaust openings and a stud —7— receives the end of a brace member —8— which is extended and secured to the reach rod —9— as indicated at —10— for insuring a rigid mounting of the cylinder with respect to the axle —1—.

A piston —11— is mounted for reciprocating movement in the cylinder and is provided with a cylindrical valve —12— having a flanged head —13— adapted to seat in the head of the piston and limit the movement of the valve in one direction in which position the openings —14— of the valve are closed to prevent the admission of air to the cylinder. The other end of the valve —12— is provided with lateral extensions —15— for limiting upward movement of the valve in the piston head but permitting sufficient movement to allow the openings —14— to admit air to the cylinder. The lower end of the piston projects below the cylinder and is provided with oppositely disposed lateral projections —16— through which extends a bolt —17— on which are journalled the ends of connecting links or hangers —18—, the opposite ends of the links being pivotally mounted on a hanger bolt —19— carried by a bushing —20— having a threaded projection —21— extending through an opening in the frame —2— to which it is secured.

In the downward movement of the frame —2— toward the axle —1— the piston —11— is moved outwardly and downwardly in the cylinder —3— during which movement the valve —12— moves upwardly in the piston to permit the intake of air into the cylinder and upon the upward or rebound movement of the frame relative to the axle the valve —12— moves downwardly so that the head —13— seats against the head of the piston closing the openings —14— whereafter the air in the cylinder is compressed and permitted to slowly exhaust through the openings —6— in the closed end of the cylinder which governs and prevents the usual quick rebound of the frame and permits it to have a slow gradual return movement to the normal position of the springs. In this way the sudden shocks and jolts occasioned in running an automobile over a rough road are eliminated and the same will have easier riding qualities.

What is claimed is:

1. A rebound shock absorber including a cylinder having means for securing it to the axle of an automobile and having restricted exhaust openings, a piston mounted in the cylinder for reciprocating movement, a valve mounted in the piston for admitting air on the outward stroke, and means for connecting the piston with the frame of the automobile for movement therewith.

2. A rebound absorber including a cylinder secured to the axle of an automobile and having restricted exhaust openings, a piston mounted for reciprocating movement in the cylinder, a cylindrical valve member mounted in the piston for admitting air to the cylinder on the outward stroke, and means for connecting the piston with the frame of the automobile for movement therewith.

3. A rebound shock absorber including a cylinder having means for securing it to the axle of an automobile and having restricted exhaust openings, a piston mounted in the cylinder for reciprocating movement, a valve mounted in the piston for admitting air on the outward stroke, and connecting links pivotally secured to the piston and the frame of the automobile for attaching the piston for movement with said frame.

4. A rebound shock absorber including a cylinder having means for securing it to the axle of an automobile and having restricted exhaust openings, a piston mounted in the cylinder for reciprocating movement, a valve mounted in the piston for admitting air on the outward stroke, said piston having lateral extensions from opposite sides thereof beyond the cylinder, and a connecting link having one end pivotally mounted on each extension and the other end pivotally connected with the frame to the piston for movement with said frame.

5. A rebound absorber including a cylinder disposed in vertical position having the open end at the bottom and removably secured to the axle of an automobile, said cylinder also having adjustable restricted exhaust openings, a piston mounted in the cylinder for reciprocating movement therein projecting beyond the lower end of the cylinder and having an air inlet valve therein, said piston having a pair of opposite lateral projections on the lower end, and connecting links journalled on said extensions and pivotally connected to the frame of the automobile for attaching the piston for movement therewith.

6. A rebound shock absorber including a cylinder secured to the axle of an automobile and having restricted exhaust openings, means to adjustably restrict said exhaust openings, a piston mounted for reciprocating movement in the cylinder, a cylindrical valve member mounted in the piston for admitting air to the cylinder on the outward stroke, and means for connecting the piston with the frame of the automobile for movement therewith.

In testimony whereof I affix my signature.

EDWARD B. DAVIS.